March 2 1943.   W. HIRT ET AL   2,312,903
LADDER-PROOF KNITTING
Filed March 31, 1939   3 Sheets-Sheet 2
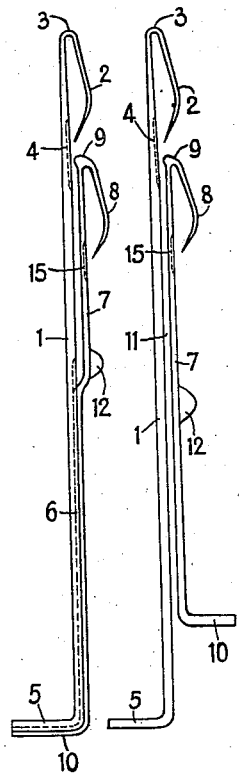
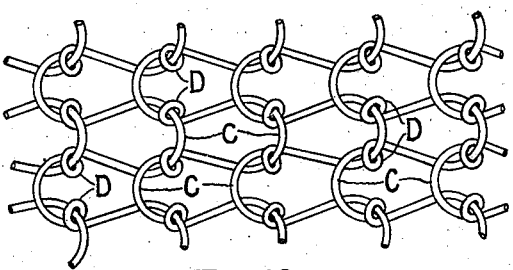
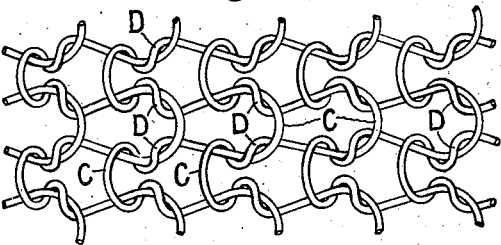
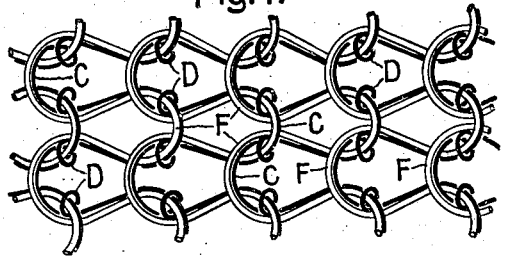

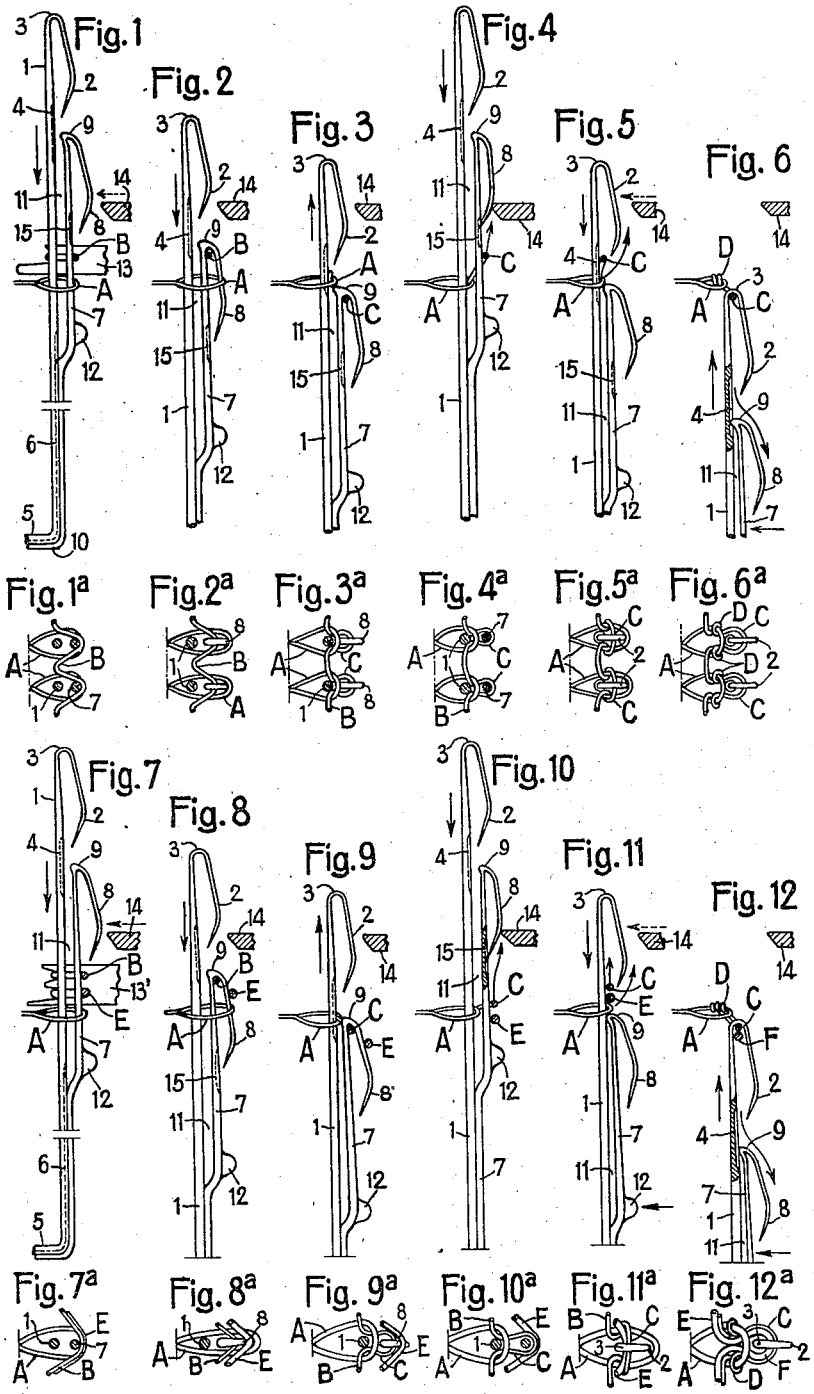

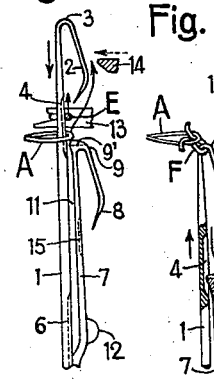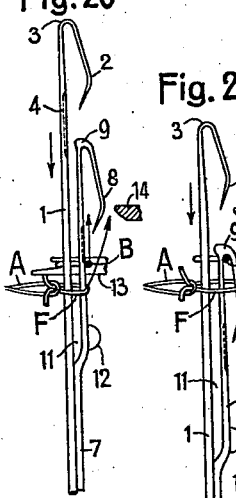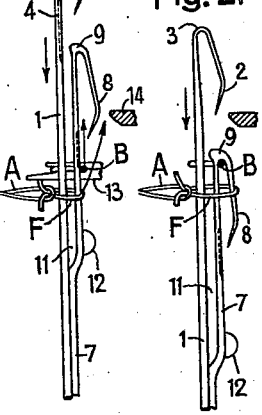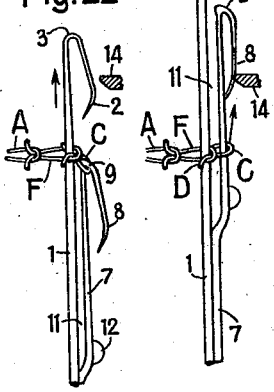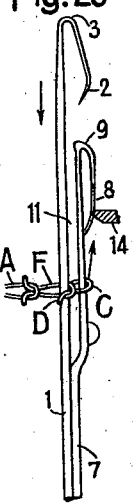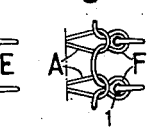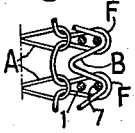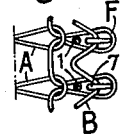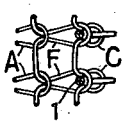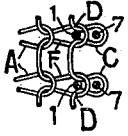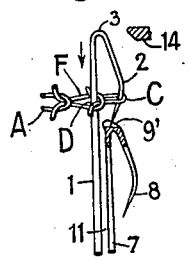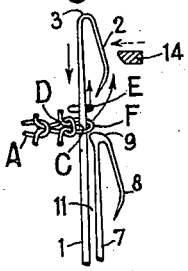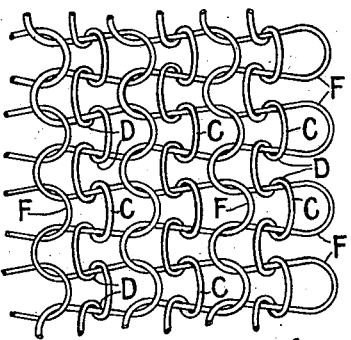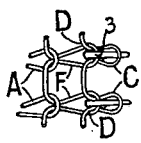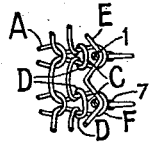

Patented Mar. 2, 1943

2,312,903

UNITED STATES PATENT OFFICE 2,312,903

LADDERPROOF KNITTING

Walter Hirt, Wetzikon, and Arnold Dürsteler, Zurich, Switzerland

Application March 31, 1939, Serial No. 265,348
In Germany April 5, 1938

14 Claims. (Cl. 66—82)

In the method of machine knitting of runproof goods according to the invention, the production of a loop structure is effected by the cooperation of a plurality of needle elements, which needle elements have their working hooks relatively stepped, i. e. each plurality comprises needle elements of different lengths.

This permits the production of run-proof yet elastic goods, for example stockings, in which the leg parts and the foot parts can be fully fashioned; in the known run-proof goods the interloopings cause the elasticity to be reduced. It is in addition possible to work with one or more yarns, for example a ground yarn and a binder yarn can be provided.

The accompanying drawings illustrate by way of example the method according to the invention and an apparatus according to the invention for practicing the method and also the structures which are produced thereby.

Figures 1 to 6 show a first example of the apparatus in various stages of its operation, Figures 1ª to 6ª are corresponding horizontal sections which further illustrate the stitch formation, using a single yarn, Figures 7 to 12 show the apparatus in various stages of operation illustrating the stitch formation using two yarns, Figures 7ª to 12ª are corresponding horizontal sections, Figure 13 shows one form of needle consisting of two elements, Figure 14 shows another embodiment of such needle, Figure 15 illustrates the knitted structure produced with a single yarn, Figure 16 shows the same structure stretched in the direction of the wales, Figure 17 illustrates the knitted structure produced with two yarns, Figures 18 to 25 show a second example of apparatus in various stages of operation, Figures 18ª to 25ª are corresponding horizontal sections which further illustrate the production of the knitted structure, and Figure 26 shows a knitted structure which can be produced.

In Figures 1 and 13 of the drawings, I is one needle element in the form of a bearded needle with beard 2, head 3, eye 4 and shank 5. A groove 6 which extends over part of the stem of the needle element I and over the shank 5 thereof, receives another needle element 7, also in the form of a bearded needle, of which the beard is marked 8, the head 9 and the shank 10.

The upper part of the stem of the needle 7 is offset so that a free space 11 is left between the stems of the needle elements. On the said offset stem of the needle element 7 is a projection 12; a sinker is marked 13 and a press 14. The two needle elements 1 and 7 of which the first is longer than the second, form together a kind of double needle with two hooks one behind the other and in stepped position. The two needles 1, 7 are secured by their shanks 5, 10 to a common needle bar, not shown, which reciprocates the double needles arranged for example parallel to one another in a flat bed, in their longitudinal direction in the requisite manner; in Figures 1ª to 6ª two adjacent double needles are shown.

In Figures 1 and 1ª, A is the last loop made on the fabric, which encircles the stems of both needles 1 and 7 and lies behind the sinker 13. B is the yarn to be knitted which is laid on the stem of the needle 7 and lies in a front catch of the sinker 13; the sinker 13 is omitted in Figure 1ª. The double needle is in its extreme forward position, from which it is first withdrawn by the needle bar into an intermediate position shown in Figure 3. In doing so, in passing through the position of Figure 2 the yarn B is hooked by the beard of the shorter needle 7 while the loop A slides over the beard 8 which has in passing been pressed into the eye 15 of the stem of the needle 7 by the press 14 whereby the beard has in passing been closed after the yarn B has passed into the beard. Thereafter the loop A, catching the enclosed yarn B, passes over the head 9 of the needle 7 which has a horn directed towards the stem of the front needle 1 and which has in the meantime been pushed into the eye 4 of the stem of needle 1 by pressure on the projection 12 of the stem of needle 7, in order to prevent the loop A from getting into the space 11; in Figure 3 the part of the yarn B connecting it to loop A is omitted. The yarn B now forms a loop C drawn through the loop A as indicated in Figures 3 and 3ª. From the half stroke intermediate position of Figure 3 the double needle 1, 7 is now pushed into its extreme forward position as in Figure 4. The loop A as shown in Figure 4 now enters the space 11 that is between the stems of the two needles so that it now lies only around the stem of the element 1; during this forward movement of the double needle the loop C comes out of the beard of the shorter needle 7. In this way the loop structure of Figure 4ª is produced.

After this the double needle 1, 7 is withdrawn from the extreme forward position to the extreme retracted position of Figure 6, the beard of the shorter needle 7 being as indicated in dotted lines in Figure 4 closed in passing by the press 14. The loop C therefore slides over the beard 8 of the shorter needle 7 and as Figures 5 and 6 show, enters the beard of the longer needle element 1. The beard of the longer needle 1 is then closed by the press 14 and the loop A which has now come between the beards of the double needle 1, 7 due to the retraction of the double needle, slides over the beard of the longer needle 1 as indicated by an arrow in Figure 5. Thus after the loop structure of Figure 5a, that shown in Figures 6 and 6a (which is here shown in the condition when the loop A has been knocked right over the closed beard of the longer needle 1) is obtained.

In the loop formation above described, the stitch loop C formed of the looped yarn B is twice drawn through the loop A, so that the yarn of loop C forms in each of its limbs a loop D (Fig. 6a) which encircles the yarn of the related loop A, thus forming a ring encircling each limb of the loop A. Accordingly if a thread of the finished knitted fabric breaks, slipping of the stitches and the formation of a run or ladder is hindered.

From the extreme retracted position of Figure 6 the double needle 1, 7 is again moved forward into the extreme forward position of Figure 1. During this forward movement the loop C comes out of the beard of the longer needle 1 and slides as indicated by the arrow in Figure 6, over the beard of needle 7. The loop C thus takes the position of loop A in Figure 1, encircling the stems of both needles 1, 7; the sinker 13 during this movement is withdrawn. After this the yarn to be knitted is again laid on the stem of the needles 7, then being looped by the corresponding sinkers 13, and the above described working cycle recommences.

Thus, a knitted fabric structure is obtained as shown in Figure 15. If this be stretched in the direction of the wales, the structure takes the form shown in Figure 16.

The apparatus shown in Figures 7 to 12 corresponds except for the sinkers, to that of the example already described with reference to Figures 1 to 6. As according to Figures 7 to 12 two yarns are to be worked simultaneously, the single sinker 13' has two front catches.

For simplicity, in describing the loop formation according to Figures 7 to 12 and 7a to 12a, a single loop A will be started with, which in Figures 7 and 7a encircles the stems of both needles 1, 7; this loop A lies below the sinker 13' (omitted in Figure 7a). As shown in Figure 7 two yarns B and E are both laid on the stems of the needles 7, the yarn E being the ground yarn and the yarn B the binder yarn; the ground yarn has here been assumed thicker than the binder yarn, but naturally both can be of the same thickness. When the double needle 1, 7 is withdrawn from the extreme forward position of Figure 7 to the half stroke intermediate position of Figure 9, the beard of the shorter needle 7 after catching the binder yarn B is in passing closed by the press 14 so that the ground yarn E and the loop A slide over this beard as may be seen in Figure 8. The loop A then carries the ground yarn E with it, unless it slips past under the latter, it being immaterial to the final result which it does; in Figure 9 it has been assumed that the loop A has slipped under the ground yarn E. During this step the loop A engages the looped binder yarn whereupon the binder yarn loop pulled through the loop A forms in its turn on the double needle a loop C as shown in Figure 9a. The double needle 1, 7 is now moved from the intermediate position of Figure 9 to the extreme forward position of Figure 10, the ground yarn E and the loop C coming out of the beard of the shorter needle 7 while the loop A comes between the stems of the two needles 1, 7, that is into the space 11, so that it encircles only the stem of needle 1, as Figure 10 shows. Figure 10a shows the corresponding loop structure.

The double needle is now withdrawn from the extreme forward position to the extreme retracted position of Figure 12, the beard of the shorter needle 7 being closed in passing after the loop C and the ground yarn E have entered under the beard of the longer needle 1 as indicated by an arrow in Figure 11, so that the loop A having come out of the space 11 slides over the beard of needle 1. The loop A is then knocked over the head of the longer needle 1, as appears from Figure 12, the loop C and the ground yarn E passing through the loop A so that the ground yarn E forms the stitch shown at F in Figures 12 and 12a, as being drawn through the loop A; the limbs of loop C when the loop A is knocked over form loops D encircling the limbs of the loop A. The double needle 1, 7 is then moved from the extreme rear position of Figure 12 into the extreme forward position of Figure 7, the loops F and C coming out of the open beard of the longer needle 1 as indicated by an arrow in Figure 12, then sliding over the beard of the shorter needle 7. Thereafter the loops C and F arrive below the sinker 13', thus taking the place of loop A of Figure 7, the ground yarn and binder yarn are again laid on the stems of needles 7 and the described cycle is repeated.

A knitted fabric structure is obtained as shown in Figure 17. As regards the binder yarn the structure corresponds to that of Figures 15 and 16 in so far as loops C of this yarn have been formed which by their limbs encircle the limbs of the loops of the preceding course with ring-like loops D. On the other hand, the ground yarn has been knitted into ordinary stitches the loops F of which are drown through the loops C.

The method can also be carried out by only laying the ground thread E on the needles 7 after the double needles have moved through half the needle stroke from the extreme forward position of Figure 7 to the intermediate position of Figure 9, the operation then continuing as in Figure 10 and so on and being otherwise the same as that above described.

According to the modification of Figure 14 the two needles 1 and 7 are not assembled into a rigid unit, but are separate from one another, provision being made to leave a space 11 between the needle stems 1, 7 which serves to receive the loops temporarily. Provision is further made to move the respective needle rows 1, 7 each by a separate needle bar, the shanks 5, 10 of the needles 1, 7 being turned in opposite directions. The provision of two separate needle bars for the two respective groups of needles permits relative adjustment of the beards of the shorter and longer needles when the machine, which can in its other construction be a flat bed or so-called Cotton machine, is regulated.

The movement of the two needle elements in this case also, takes place simultaneously as described in the preceding examples, first a half stroke being effected from the extreme forward position of the needle elements, followed by a return to the extreme forward position and then a full stroke from the extreme forward to the extreme retracted position and finally a movement back to the starting position i. e. the extreme forward position.

The construction of the needles is naturally not limited to that shown in the examples illustrated.

In the examples according to Figures 18 to 25 the head 9 of the needle 7 is provided with an eye 9'. To move the needles 1 and 7 two respective cams (not shown) or equivalent operating elements are provided, by which the double needles arranged parallel with one another for example in a flat needle bed are reciprocated longitudinally in the requisite manner by the aid of respective needle bars. Two adjacent double needles are shown in Figures 18ᵃ to 25ᵃ.

In Figures 18 and 18ᵃ, A indicates the last made loop of the fabric, which encircles the stem of the needle 1 and lies below the sinker 13. E is the ground yarn to be knitted, which is laid on the stems of the needles 1 and lies in a front catch of the sinkers 13; the sinker is omitted in Figure 18ᵃ. In Figure 18 the double needle is in an intermediate position from which it moves in the direction of the arrow to the extreme retracted position of Figure 19. During this retraction of the double needle, as indicated by an arrow in Figure 18, the ground yarn E enters under the beard of the longer needle 1 while the loop A passes over its tip 2 which has in passing been closed into the eye 4 of the needle 1 by the press 14, after the yarn E has entered under the beard of the needle. Thereafter the loop A is then knocked over the head of the needle 1 passing over the looped ground yarn which thus forms the stitch F drawn through the loop A as shown in Figures 19 and 19ᵃ.

From the extreme retracted position of Figure 19 the double needle 1, 7 is moved forward into the extreme forward position of Figure 20. The loop F, as indicated by an arrow in Figure 19, comes out from under the beard of the needle 1 and slides over the beard of the needle 7 on to the stem of the latter; the loop F then encircles the stems of both needles 1, 7 as shown in Figure 20. During the said forward movement of the double needle the shorter needle 7 has the stem-directed horn on its head 9 temporarily pressed into the eye 4 in the stem of the needle 1 by pressure exerted on the projection 12 on the stem of the needle 7, in order to prevent entry of the loop A into the intermediate space 11. In the extreme forward position of the double needle 1, 7 as shown in Figure 20, the binder yarn B is laid on the stem of the needle element 7, above the loop F, and is then looped by the sinker 13 (Figure 20ᵃ). The double needle is then withdrawn part of its stroke from the extreme forward position, the looped binder yarn B coming under the beard of the needle 7 in the manner indicated by an arrow in Figure 20, while the loop F slides over the beard of the needle 7, the tip 2 being for this purpose transitorily pressed into the eye 15 in the stem of this needle, by the press 14. Figure 21 shows an intermediate stage of this return movement of the double needle, which movement consists of a half stroke, finishing in the position of Figure 22. In Figures 21 and 21ᵃ the looped yarn B is under and the loop F is over the beard of the needle 7. The loop F then slides over the beard of the needle 7 and so over the looped binder yarn which thus forms the stitch C drawn through the loop F as in Figures 22 and 22ᵃ.

From the mid position of Figure 22 the double needle is moved to the extreme forward position of Figure 23, the loop C sliding back on the stem of the needle 7 and out from under the beard thereof, while the loop F slides back on the stem of the needle 1 and comes into the intermediate space 11 between the needles 1, 7. The double needle now moves back a full stroke into its fully retracted position. During this movement the loop C slides in the direction of the arrow shown in Figure 23 over the beard of the needle 7 transitorily closed by the press 14. Further a relative movement between the needles 1, 7 occurs which brings the tip 2 of the longer needle 1 into the eye 9' on the head 9 of the shorter needle 7, as Figure 24 shows, so that the loop C sliding off the beard of the needle 7 then slides over the beard of the needle 1, while the loop F can and does pass up under the beard of the needle 1. In this way after the binder yarn B laid along the stems of needles 7 according to Figure 20, has been formed into a loop C by the steps described with reference to Figures 21, 22 and 23, it is looped ringwise round the two limbs of the previously formed loop F as at D in Figures 23 to 26, the loop C formed by the binder yarn being finally knocked over the needle 1, while the loop F is held back by the needle 1.

A relative movement of the needles 1, 7 then takes place, at least the long needle 1 moving forward, so that the beard of the needle 1 is released and the loop F moves out from under this beard as Figure 25 shows; if in this step the needle 7 is also moved forward, its movement must obviously be less than that of needle 1. Then as shown in Figure 25 the ground yarn E is again laid on the stems of the needles 1 above the loop F and looped by the sinkers as appears from Figure 25ᵃ. Thus the working position of Figures 18 and 18ᵃ is again reached and the cycle above described is repeated, in that by means of the double needle first a normal stitch F is produced, then the binder thread B laid on the stem of the needle 7 and a stitch C produced and so on. The knitted structure shown in Figure 26 is obtained. This comprises, as a result of the steps described, the stitches formed by the aid of the binder yarn B, between the bights of the loops of a row of loops, consisting of normal loops formed of the other yarn E, the limbs of which are encircled by the loops D of the former thus making the fabric run-proof.

The method of the invention can be practiced for example on a suitably arranged flat bed knitting machine, namely a so-called Cotton machine.

What we claim is:

1. In the production of knitted goods the steps which include drawing a secondary loop through a normal loop of a preceding course of stitches a plurality of times by means of point needles, thereby producing looping parts in the limbs of the secondary loop which encircle the limbs of the loop through which it has been drawn.

2. In the production of knitted goods the steps which consist in drawing a secondary loop of ground yarn once and a secondary loop of binder yarn a plurality of times through a normal loop of a preceding course of stitches, thereby producing ordinary stitches in the ground yarn and looping parts in the limbs of the secondary loop of binder yarn which encircle the limbs of the loop through which it has been drawn.

3. In the production of knitted goods the steps which consist in drawing a secondary loop of ground yarn once and a secondary loop of binder yarn a plurality of times through a normal loop of a preceding course of stitches comprising both ground and binder yarn, thereby producing ordinary stitches in the ground yarn and looping parts in the limbs of the secondary loop of binder yarn which encircle both yarns in the limbs of the loop through which it has been drawn.

4. In the production of knitted goods the steps which include drawing a secondary loop of ground yarn through a normal loop of a preceding row of stitches thereby producing a normal stitch, and drawing a secondary loop of binder yarn twice through said first secondary loop thereby producing looping parts in the limbs of the loop of binder yarn which encircle the limbs of the loop of ground yarn.

5. A method of knitting which includes drawing a secondary loop through a previously formed normal loop once by each one of a plurality of associated knitting needles.

6. A method of knitting as set forth in claim 5 wherein the knitting needles are moved simultaneously by the same amount.

7. A method of knitting which includes the steps of knitting a normal stitch in a ground yarn by one of a pair of stepped needles, drawing a loop of binder yarn through the loop of said normal stitch by means of said needle, and then drawing said loop of binder yarn again through said normal stitch loop by means of the other said needle.

8. A method of knitting which comprises knitting a course of normal stitches in a ground yarn by means of a row of long bearded needles, passing a row of shorter bearded needles through said course of normal stitches, laying a binder yarn on the stems of said shorter needles and looping it between them, drawing said binder yarn loops through said normal stitches by said shorter needles, moving said needles relatively to one another to bring the tips of the beards of the long needles into engagement with the heads of the beards of the shorter needles, and knocking the normal stitches over both sets of needles while catching the binder yarn under the beards of the longer needles, and moving said needles apart to admit a new ground yarn for the next course.

9. A knitting machine comprising two bearded needles, an eye on the head of the shorter of said needles and means for moving the two needles relatively to one another to cause the tip of the longer needle to enter said eye whereby, while one loop of yarn can pass along the stem of the longer needle beneath its beard, another loop can pass over the beards of both needles.

10. A knitting machine comprising two needles having their stems spaced apart towards the operating ends, a horn on the head of the shorter needle directed towards and opposite an eye in the stem of the longer needles, a projection on the stem of the shorter needle, and means adapted to press on said projection and thereby deflect said shorter needle to cause said horn to enter said eye.

11. A method for mechanical production of run-proof knitted goods on flat-knitting machines, in which the knitted structure is produced by the cooperation of a plurality of needles at each course said needles being arranged one behind another and having beards relatively stepped and extending in the same direction, the control of the needles being such that the stitches of a course encircle the stitches of a preceding course with ring-like loops.

12. A flat-knitting device for the mechanical production of run-proof stockings and the like comprising a plurality of bearded needles arranged one behind another and having their beards in stepped position, but extending in the same direction, in combination with one single common press for temporary closing the beards of the needles, and means for moving said needles relatively to one another.

13. In a machine for producing run-proof knitted goods, the combination comprising double needles having their points arranged in a row under each other and on the same side and their stems being spaced so as to form an intermediate space serving for the reception of the course to be transferred, a nose on the heads of the lower needles to enclose said space by the action of the press.

14. The combination as set forth in claim 13 in which said pointed needles are independently movable and the lower needles are provided on their heads with an eye for receiving the beards of the higher needles.

WALTER HIRT.
ARNOLD DÜRSTELER.